United States Patent
Swanson

(12) Patent No.: US 6,292,911 B1
(45) Date of Patent: Sep. 18, 2001

(54) ERROR DETECTION SCHEME FOR A HIGH-SPEED DATA CHANNEL

(75) Inventor: Eric J. Swanson, Buda, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/215,430

(22) Filed: Dec. 17, 1998

(51) Int. Cl.$^7$ ................................................. G01R 31/28
(52) U.S. Cl. ............................................................ 714/715
(58) Field of Search ............................... 714/42, 43, 56, 714/715, 821, 728, 736, 739, 819, 824, 712; 375/224

(56) References Cited

U.S. PATENT DOCUMENTS

| | | |
|---|---|---|
| 4,519,077 | 5/1985 | Amin . |
| 5,414,713 * | 5/1995 | Waschura et al. .................. 714/715 |
| 5,455,939 * | 10/1995 | Rankin et al. .......................... 714/6 |
| 5,511,024 | 4/1996 | Ware et al. . |
| 6,182,254 * | 1/2001 | Bae ....................................... 714/718 |

OTHER PUBLICATIONS

Floyd et al., Real time on board bus testing, IEEE, p. 140–145, 1995.*
Gasbarro, Testing high speed DRAMS, IEEE, p. 361. 1994.*
Su et al., "Experimental Results and Modeling Techniques for Substrate Noise in Mixed–Signal ICs," IEEE JSSC, 28, pp. 420–430, Apr. 1993.
Stanisic, et al., "Addressing Substrate Coupling in Mixed–Mode ICs," IEEE JSSC, Mar. 1994, pp. 226–238.
Toshiba paper, "Toshiba MOS Digital Integrated Circuit Silicon Monolithic," TX59R7218XB, Jul. 15, 1998, pp. 1–61.
IBM paper, "128 Mb Direct RD RAM [TM]," 19L3262.E35846, May 4, 1998, pp. 1–64.
Rambus paper, "Applying Rambus Technology to Graphics", 903010121012, 1992/93, pp. 1–107.
Neil H.E. Weste, Kamran Eshraghian, "Principles of CMOS VLSI Design—A Systems Perspective", Second Edition, Addison–Wesley Publishing Company, pp. 495–497, 508–510.
Edward A. Lee, David G. Messerschmitt, Digital Communication, Second Edition, Kluwer Academic Publishers, Boston, pp. 591–608.
Paul Horowitz, Winfield Hill, "The Art of Electronics," Cambridge University Press, Cambridge, pp. 436–446.
Edward A. Lee, David G. Messerschmitt Digital Communication, Second Edition, Kluwer Academic Publishers, Boston, pp. 591–608.
Steven Ray, Rambus Layout Guide, DL–0033–03, Rambus, Mountain View, California, Jan. 1998, pp. 1–A–4.
Direct Rambus Technology Disclosure, DL–0040–00, Rambus, Mountain View, California, Oct. 15, 1997, pp. 1–16.

* cited by examiner

*Primary Examiner*—Albert Decady
*Assistant Examiner*—Shelly A Chase
(74) *Attorney, Agent, or Firm*—William W. Kidd; Blakely, Sokoloff, Taylor & Zafman

(57) ABSTRACT

A technique for detecting error when transferring data on a data channel between components disposed on the data channel. A test pattern is generated by a controller on the data channel and sent to a data storage component on the channel. The data storage component tests the received test pattern to determine if the pattern has been corrupted.

34 Claims, 9 Drawing Sheets

ERROR DETECTION SCHEME FOR A HIGH-SPEED DATA CHANNEL

BACKGROUND OF THE INVENTION

1. Field of the Invention

The present invention relates to the field of data transfer on a high-speed data channel and, more particularly, to an error detection technique to detect errors on the channel.

2. Background of the Related Art

High-speed data channels are known in the art for use in the transfer of data between components or circuits resident on the channel. Typically, a data channel employs a particular bus architecture with data transfer protocol defined by the architecture. The channel architecture may also have certain physical requirements to ensure that the channel operates within the required design specifications. Further, the design specifications become more stringent as the rate of the data transfer increases (increase in the bandwidth) and meeting the design specification is imperative for proper operation of devices resident on the data channel.

When high-speed data channels are designed for the transfer of data between various components (such as semi-conductor chips), the data channel is typically placed on a medium which also houses or supports the components. For example, to transfer data between a processor (or controller) and a separate memory not residing on-chip with the processor, a printed circuit (PC) board is utilized. The data channel is fabricated on the PC board and the components reside on the PC board. In computer parlance, this PC board is often called the "mother board" when the central processing unit (CPU) is resident thereon or a "video card" when a graphics controller is resident thereon.

One well-known high-speed data channel architecture in use is the Rambus™ data channel (or Rambus channel). The Rambus channel is a high-speed, byte-wide (9 bits), synchronous, chip-to-chip interconnect designed to achieve 600 Mega bytes per second (MB/sec) and greater data transfer rates between components on the channel. One specific Rambus channel, referred to as the Direct Rambus™ channel, is specified to transfer data at 1.6 Giga bytes per second (GB/sec) between components on the channel. In order to operate on the channel, the various components operating on the Rambus channel must interface with the channel and meet the stringent requirements imposed on these components, which are referred to as Rambus components.

In a typical layout, a number of memory components are resident on the channel along with one or more controllers or processors which manipulate the data stored in the memory. For example, the Rambus channel has strict requirements specifying the layout of the channel and the components (chips) which utilize the channel. The various chips are placed at designated locations on the board according to the design specifications. The components have the necessary interface circuitry for coupling onto the channel so that the components qualify as Rambus components. For example, dynamic random-access-memories (DRAMs) meeting the Rambus specification requirements are referred to as Rambus DRAMs or RDRAMs. The RDRAMs are capable of achieving the high speed data transfer to and from a processor (or controller) coupled onto the channel.

On any data channel, bit errors are encountered for a variety of reasons. Many of the bit errors are due to interference present when data is transferred on the channel and, on high-speed data channels, higher rates of data transfer increase the likelihood of errors due to interference. For example, when a controller chip transmits data over the channel to the memory for data storage, noise, jitter, cross-talk from other data lines, etc. can cause a given data line to have the wrong value (bit state). The cause of the error may not reside on the data path itself. Where multiple buses/links/channels are present, the cause of the interference can be from these other data paths or components coupled to them. The problem can be complicated if the error is due to a combination of these causes.

On high-speed data channels, such as the Rambus channel, error detection is difficult to achieve where a controller transmits data to the memory (store operation) and then later retrieves the data (load operation) for processing. In a simplistic approach, data can be stored in the memory, retrieved and compared with the original transmission to determine if an error occurred. However, this approach fails to determine if the error occurred during transmission or retrieval.

In another technique, signature analysis could be used to monitor the activity on the channel. However, because of the contributory interference activity of neighboring buses and components, it is difficult to determine the occurrence of an error, as well as duplicating the conditions which caused the error. Furthermore, the occurrence of the bit error may be more prevalent at a particular signal state present on the channel and such a state may be difficult to detect or even duplicate utilizing signature analysis alone. Debugging would be difficult or impossible without identifying the source(s) of the interference causing the bit error.

While bit error detection itself is not new, bit error detection has not been implemented on high-speed data channels, especially in the instance where the high-speed data channel is a subsidiary communication link separate from the main processing bus. Thus, in the personal computer (PC) environment, diagnostics associated with the central processing unit are widely utilized, but not so in high-speed data links, such as the Rambus channel. However, it is apparent that as graphics accelerators continue to increase in speed, debugging the high speed activity between the graphics accelerator and its high-speed graphics memory becomes more difficult and some form of diagnostic tool will be required for efficient debugging of the high-speed data channel.

The present invention describes a technique for introducing a scheme for detecting bit errors on the high-speed data channel, such as the Rambus channel, and further determine if a given error occurs during transmission or retrieval of data.

SUMMARY OF THE INVENTION

The present invention describes a technique for detecting an error when transferring data on a data channel between a controller and a data storage component disposed on the data channel. A test pattern is generated by the controller and transmitted on the data channel. The data storage component on the data channel receives the test pattern and tests the pattern to determine if the test pattern has been corrupted.

DETAILED DESCRIPTION OF THE INVENTION

Figure 1:
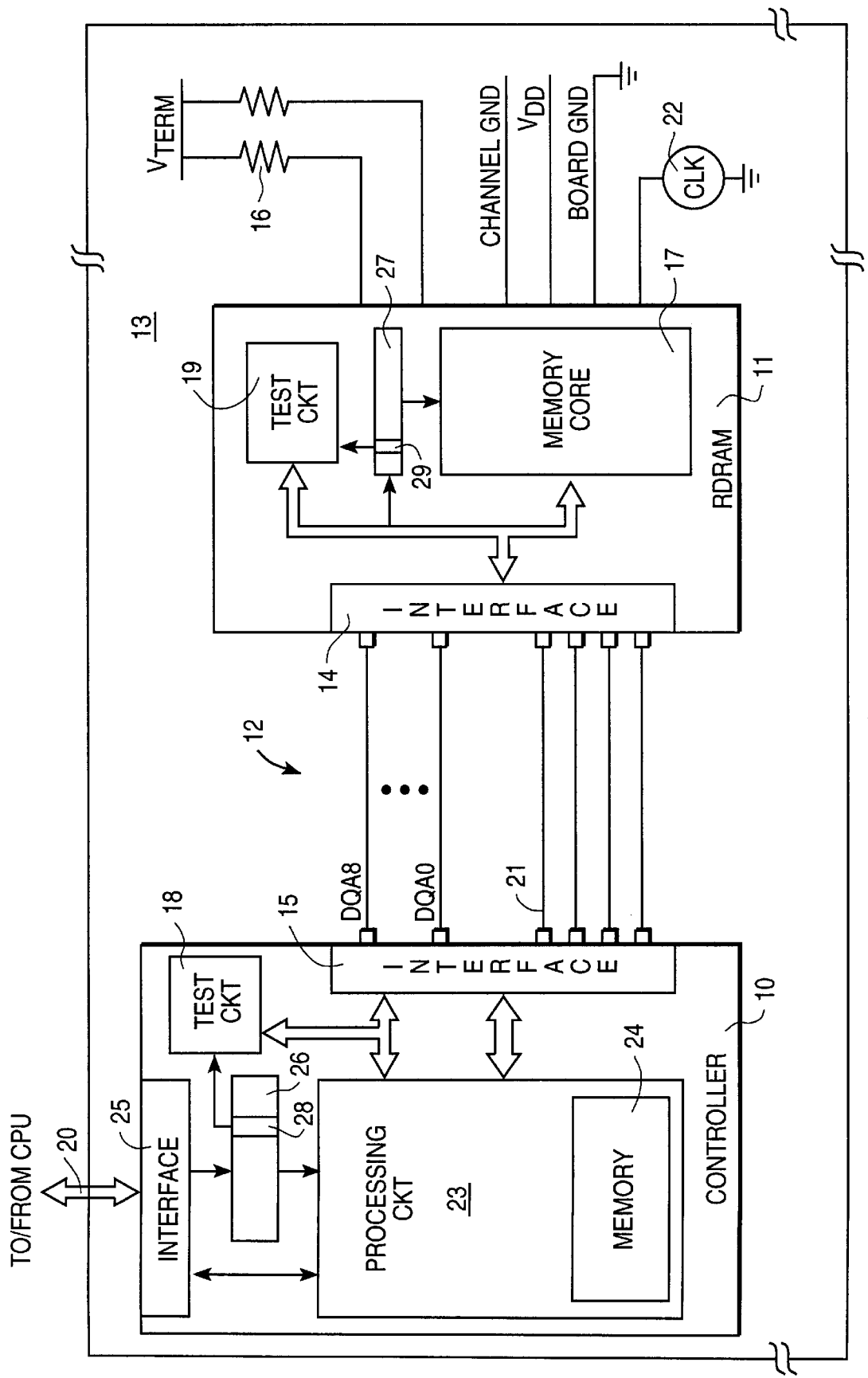
FIG. 1 is a circuit schematic diagram showing a high-speed data channel and components resident on the channel, including a controller for sending data onto the channel and a memory for receiving and storing the received data, in which test circuitry present in the controller and the memory are utilized to practice the present invention to detect data transmission errors.

Referring to FIG. 1, it shows a controller/processor 10 coupled to a memory 11 by a high-speed data channel 12. In the particular example, channel 12 is comprised of power, ground and signal lines that are fabricated as part of a printed circuit (PC) board 13. The components 10 and 11 are then mounted onto the PC board 13. Although the data channel 12 can be of a variety of high-speed data channels, the preferred embodiment (and the example shown) implements a high-speed, byte-wide (9-bits), synchronous, chip-to-chip interconnect designed by Rambus Inc. of Mountain View, Calif., which is referred to as the Rambus™ channel. The Rambus channel is capable of achieving high-speed data transfer rates, in the order of 600 MB/sec and greater, including rates as high as 1.6 GB/sec.

The memory 11 is typically a dynamic random-access-memory (DRAM) utilized for storing data. Since memory 11 is designed to operate on the Rambus channel 12, it includes an interface circuit 14 to allow the memory 11 to transfer data to or from the channel 12. The memory 11 is referred to as a RDRAM (Rambus DRAM), since it is used on the Rambus channel 12. Typically, a plurality of such memories 11 are placed on the board 13 to operate on the channel 12. The actual storage of data is within a memory core 17 of memory chip 11.

The controller/processor 10 can be of a variety of processing units for processing data and also performs the task of transferring or otherwise manipulating the data stored in memory 11. The controller/processor 10 can be of a variety of processing devices and may be referred to by various names, but for simplicity, it will be referred to as controller 10 in the description below. Like the memory 11, the controller 10 is a Rambus channel compliant component, designed to operate on the Rambus channel. The controller 10 has a processing circuitry 23, which generally includes various digital circuits to perform the processing task(s) required of the controller, as well as to control the data transfer to and from the memory 11. The controller 10 typically includes its own memory 24 for storing data.

The controller 10 also includes an interface 15, which circuitry allows the controller 10 to be coupled to the channel 12 and operates pursuant to the specification requirements set out for the Rambus channel for data transfer on the channel 12. Thus, controller 10 is the intelligent component on the channel 12 for controlling the data transfer to and from other components on the channel, namely memory 11. It is appreciated that other buses, data channels, etc. (such as a PCI bus) are typically coupled to the controller 10, separate from the channel 12, for transfer of data to and from other components not located on the channel 12.

For example, a peripheral components interconnect (PCI) bus 20 is shown coupled to the controller 10 through an interface 25. The bus 20 provides a link to other components, including a processor (such as a central processing unit, CPU, of a computer) which sends instructions, as well as data, to the controller 10. Instructions communicated to the controller 10 are generally routed to an instruction handling circuitry. In the example, a control register 26 is shown for receiving and retaining the instruction signals for controlling the operation of the controller 10. More than one control register 26 can be used. Accordingly, one use of the high-speed channel 12 is to accelerate a particular processing function (such as graphics acceleration) by the use of the controller 10, while other components or devices of the system not on the channel 12 operate at a slower data transfer rate.

In reference to the Rambus channel, the Rambus channel specification requires a termination at the other end of the channel, since the output driver utilized in the Rambus interface is an open-drain transistor. The termination is provided by having each data line coupled to $V_{TERM}$ through a termination resistor 16. The Rambus channel requires the open-drain driver, which transistor has its drain coupled to the appropriate data line of channel 12 and its source coupled to a channel ground 21. Also noted on the board 13 are a supply voltage $V_{DD}$ for powering the chips 10 and 13, a board ground for providing the chip ground and a clock (CLK) 22 for clocking the devices coupled to channel 12.

Also shown in FIG. 1 are test (or diagnostic) circuitry for each of the devices 10 and 11. A test circuitry 18 is included within the controller chip 10, while a test circuitry 19 is included within the memory chip 11. The test circuits 18, 19 are coupled to the channel 12 through the corresponding interfaces and the circuits 18, 19 are activated when the devices 10, 11 enter into a test mode for testing data transfer between the two devices.

As noted above, the prior art practice of testing data transfers on the channel 12 entailed the transmission of data from the controller 10, storing the data in memory, recalling the data and determining if the received data has been corrupted during the interim period. Thus, a round-trip data transmission analysis is utilized in the prior art. The round-trip technique was utilized since the receiver of the data cannot determine if the data being received has been corrupted during transfer. The present invention implements a test circuitry in each of the devices to have the devices enter into a diagnostic mode and to provide diagnostics during a one-way data transmission. That is, data being transmitted from one device is analyzed for error when received by the receiving device.

It is appreciated that the test circuitry of the present invention provides a separate diagnostic solution in detecting and diagnosing errors on the high-speed data channel. Hardware circuitry is included in the test circuitry, since hardware can provide a faster response in detecting errors. It is appreciated that software operation alone under control of the main processor will be too slow to respond to diagnosing and detecting errors occurring on the data channel.

In order for a device on the channel 12 to determine if the particular data being received has been corrupted, the receiving device will need to know what data is being transmitted. In this manner, the received data can be compared to the expected data to determine if a bit error has occurred during transmit. However, not just any data can be utilized for this test and, typically, a worst case data pattern is not known. The worst case pattern is defined as that pattern which produces the greatest sensitivity to error. Since the testing is performed to determine the various sequence of events which can generate an error, it is desirable to send a number of bit patterns across the channel to ensure that a representative number of patterns have been tested. To ensure that certain bit patterns are not missed (which missed patterns may include the worst case pattern), it would be preferable to test many of the bit patterns. The test circuitry of the present invention allows bit pattern testing to be performed on the devices coupled on the data channel 12.

In the practice of the invention, a test bit pattern is generated by the test circuit 18 and transmitted from the controller 10 onto the channel 12 during a test (or diagnostic) mode. The bit pattern is output onto the channel 12 as though it is a normal data transaction onto the channel 12 by the controller 10. Assuming that the selected destination on the channel is the memory 11, the data will be received by the memory 11 and stored in the memory core 17.

It is to be noted that the diagnostic mode is a special mode entered into by the devices on the data channel 12. Although the controller can be made to enter into the diagnostic by a variety of ways, generally an instruction is received on the bus 20 from another device. In the preferred technique, a central processor will send an instruction, which is stored in the control register 26. A bit 28 is set to cause the controller 10 enter into the diagnostic mode. It is appreciated that additional bits can be used to identify a particular diagnostic routine to execute if such control is desired. For example, additional bit(s) can be used to distinguish between error detection when sending data and when receiving the returning data.

In the memory 11, a similar control register (or registers) 27 is present to receive instructions from the controller 10 over the channel 12. The control register 27 also has a bit 29 which is set to have the memory 11 enter into a diagnostic mode. Again additional bits could be utilized to identify a particular routine to be performed.

In operation, the controller is instructed to enter into the diagnostic mode. The diagnostic mode pertains to the channel 12 only, so that other system operations outside of the channel 12 activity can continue to be performed. For example, in a computer, the CPU can continue to perform its operations normally. Once bit 28 is set in the controller, the controller will then set bit 29 in the control register 27 to cause the memory 11 to treat the incoming data as test data.

In the preferred technique, the test circuit 18 is reset or triggered to generate a test bit pattern. The test circuit 19 includes a duplicate test pattern generator so that a duplicate bit pattern is generated within memory 11. The two test circuits 18, 19 can be reset so that both start at the same state, or the two can be designed as self-synchronizing units. What is important is for the two units 18, 19 to synchronize the pattern generation so that the patterns from the two are the same. Accordingly, when the initial test pattern is received from the controller 10, the received pattern is compared to the duplicate bit pattern in the memory 11 to determine if the received test pattern has been corrupted. A difference in the two patterns indicates that a bit error(s) occurred during this data transfer. The pattern testing is performed in the test circuit 19 for testing the data transferred over the channel 12. The incoming pattern can be stored in the memory core 17, if data return testing is to be performed as described below.

Assuming that the first data transfer resulted in no corruption of the test pattern, the data which was stored in the memory core 17 (if it was stored) can be returned to the controller 10 during a second phase of the testing cycle. Thus, during the second phase, the stored bit pattern is loaded from memory 11 and sent back to the controller 10. The controller 10 can now compare this returning bit pattern to the originally sent pattern to determine if an error occurred during the retrieval process. One technique is for the controller 10 to retain the originally sent pattern in a storage area (memory 24 in the example) and then make a comparison of this pattern to the returning data pattern. Alternatively, the test circuit 18 could be reset and then used to generate the same pattern as before to regenerate the same pattern for comparison. One preferred technique for implementing the test circuitry is described below.

It is appreciated that a variety of bit patterns can be designated for use in performing the diagnostics. However, typically it is difficult to determine those bit patterns which may be susceptible to error during transmission. In this regard, the diagnostic is being performed to localize states which are susceptible to error. Accordingly, in order to ensure that some or all of those error producing bit patterns are tested, random or pseudo-random test patterns are selected. The preferred technique generates pseudo-random bit patterns for transmission on the channel 12 to test the system in both directions.

Figure 2:
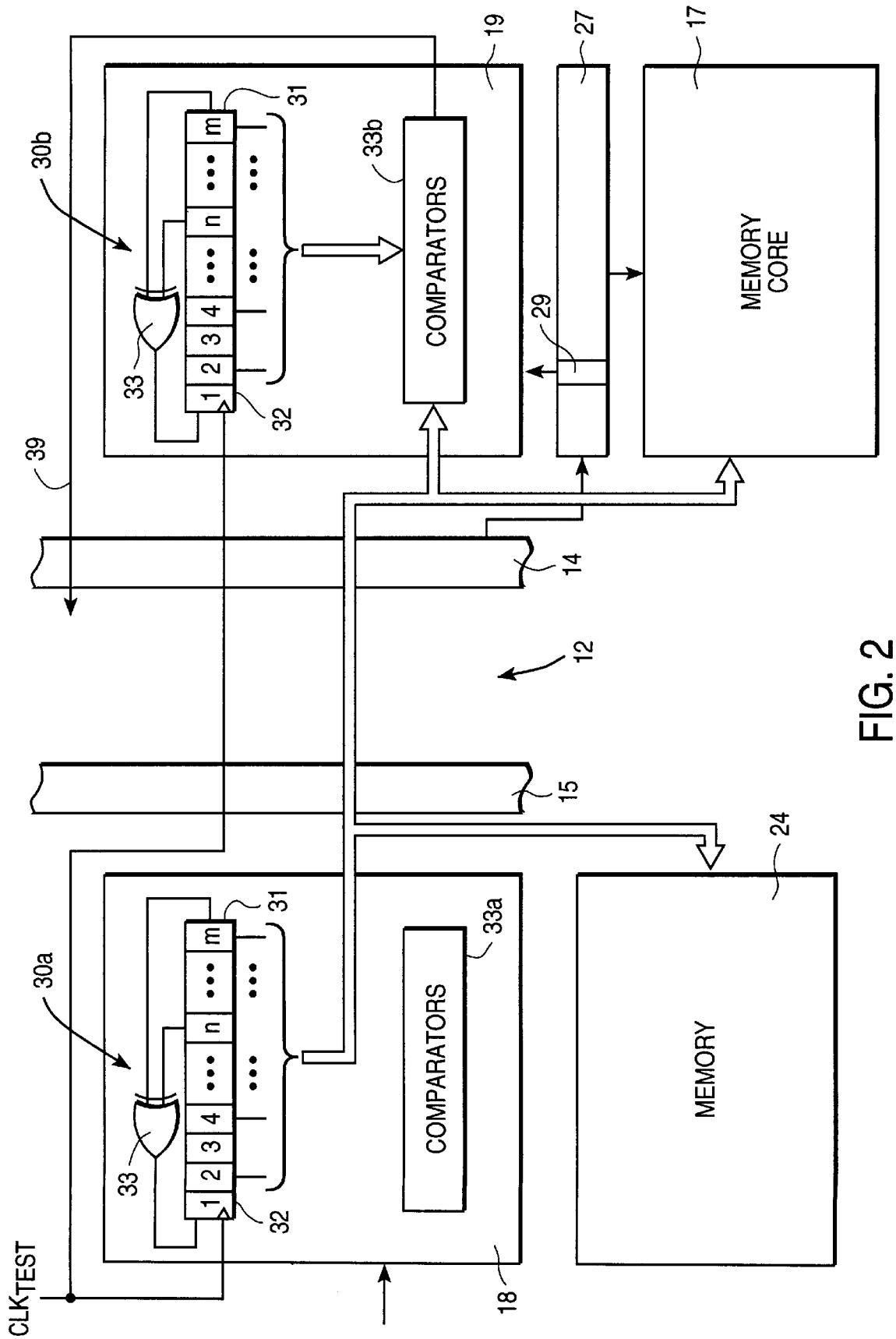
FIG. 2 is a circuit schematic diagram illustrating the implementation of the test circuitry of the preferred embodiment in detecting errors when data transfer is from the controller to the memory in the data channel system shown in FIG. 1.

Referring to FIG. 2, it illustrates the implementation of the first phase of the test sequence as implemented in the preferred embodiment. The first phase tests the transmission of data from the controller 10 to the memory 11. Although a variety of bit pattern generators can be used, the preferred embodiment utilizes a pseudo-random bit pattern generator 30a, which is included within test circuit 18. Furthermore, the preferred embodiment utilizes a particular pseudo-random pattern generator which is generally known as a linear feedback shift register (LFSR). Thus, the pseudo-random bit pattern generator 30 implements a series of shift registers 32, which are arranged to form a LFSR 31.

As shown in FIG. 2, the LFSR 31 is comprised of m shift registers to generate a p-bit pattern. In the Rambus channel example where there are nine data bits, p=9 (or p=8, plus a parity bit). In a typical LFSR arrangement, LFSR 31 would have m>p. For example, m would equal 20 and the p bits would be obtained from selected shift register outputs. The output of the $m^{th}$ bit position is fed back to the input (bit position 1) through the exclusive OR (XOR) gate 33. An output from one of the bits (noted as the $n^{th}$ position bit) is also fed back through the XOR gate 33. Typically, D-type flip-flops are used at each bit position and serially configured to provide the register 31. Also, additional XOR gates can be used to introduce more feedback in the LFSR.

It is appreciated that the operation of LFSRs is generally known and the type of bit pattern sequences to be generated will depend on the feedback configuration implemented. For the example above, it is appreciated that the maximum pseudo-random sequence length that can be generated is determined as $2^m-1$ clock periods. For a 20 bit sequence, the sequence pattern is $2^{20}-1$ and the bit patterns of 8 or 9 bits (p=8 or 9) would be selected from certain designated bit outputs of this sequence. The bit pattern consisting of all zeros is not permitted, since the LFSR will not work when the states are all zero. The LFSR can be designed to cycle through less than $2^m-1$ patterns, but the preference is to design the LFSR 31 to be a maximal-length shift register so that all $2^m-1$ combinations are generated in the sequence. Accordingly, it is preferred to have LFSR 31 as a maximal-length shift register, even though only some of the individual bit outputs are utilized for the generation of the bit patterns.

The LFSR 31 cycle commences from a reset state, which state is determined by the feedback configuration. A clock signal $CLK_{TEST}$ (which may be separate from the channel clock CLK) is coupled as an input to bit 1 shift register 32 to clock the state changes. The LFSR 31 then cycles through the designed sequence under timing of the $CLK_{TEST}$ signal. After a complete cycle, the LFSR repeats the same sequence. Thus, the bit pattern sequence being generated is always predictable, but is pseudo-random in the pattern being generated.

The selected outputs of the pseudo-random generator 30a are coupled through the interface 15 and onto the data lines of the channel 12. The bit pattern is received by the memory 11 through its channel interface 14 and coupled to the test circuit 19. The test circuit 19 also includes a pseudo-random bit pattern generator 30b, which is substantially a duplicate of the pattern generator 30a. The same clock signal $CLK_{TEST}$ is utilized to clock the generator 30b. Accordingly, if the two pattern generators are configured to have the same pattern sequence and are clocked with the same signal, one would be an exact duplicate of the other in generating the patterns when synchronized. That is, the pattern generator 30b is synchronized with the generator 30a, so that the pattern generation from the generator 30b mirrors that of the generator 30a. When configured as maximal-length shift registers, both will cycle through the $2^m-1$ sequence of patterns in identical fashion and when the same outputs are selected, the test bit patterns will also be identical.

Utilizing this combination, the pattern generator 30b will output a bit pattern identical to the pattern generated by the generator 30a in test circuit 18. Thus, the pattern from the generator 30b is the expected pattern to be received from the channel 12. Then, as shown, the bit pattern from the pattern generator 30b and the data received from the channel 12 are input into a comparator circuit 33b to compare the two patterns. A comparison of the corresponding bit states is performed. No error is detected if all of the bits of the two patterns match. Alternatively, a bit error is noted when two corresponding bits do not match. The process is repeated for each pattern generated.

A number of alternatives are available for indicating the occurrence of an error in the pattern matching. One scheme is to make an entry, such as in the memory core 17 or in an error detection register. Then, this location can be read to determine if an error did occur. However, the preferred technique is to have an error detection signal 39, which can be used as a trigger for error notification. This error detection signal is coupled through the interface 14 for output onto channel 12. The trigger can be used as an interrupt, for activating diagnostic routines or triggering certain hardware devices to perform measurements or debug analysis. The error detection signal can use a separate pin on the device, but generally it is preferred to use a pin already present. That is, a multi-function pin, when in the diagnostic mode, can provide a rapid indication of an error occurring in the transmission of data from the controller 10 to the memory 11.

It is appreciated that the two pattern generators will cycle through the sequence of patterns in an identical fashion, with each pattern undergoing the comparison at the received end. Furthermore, it is desirable to store the received data into the memory core 17. Accordingly, the received pattern is stored for later use, whether for error diagnostics or for transmission on the return leg.

Figure 3:
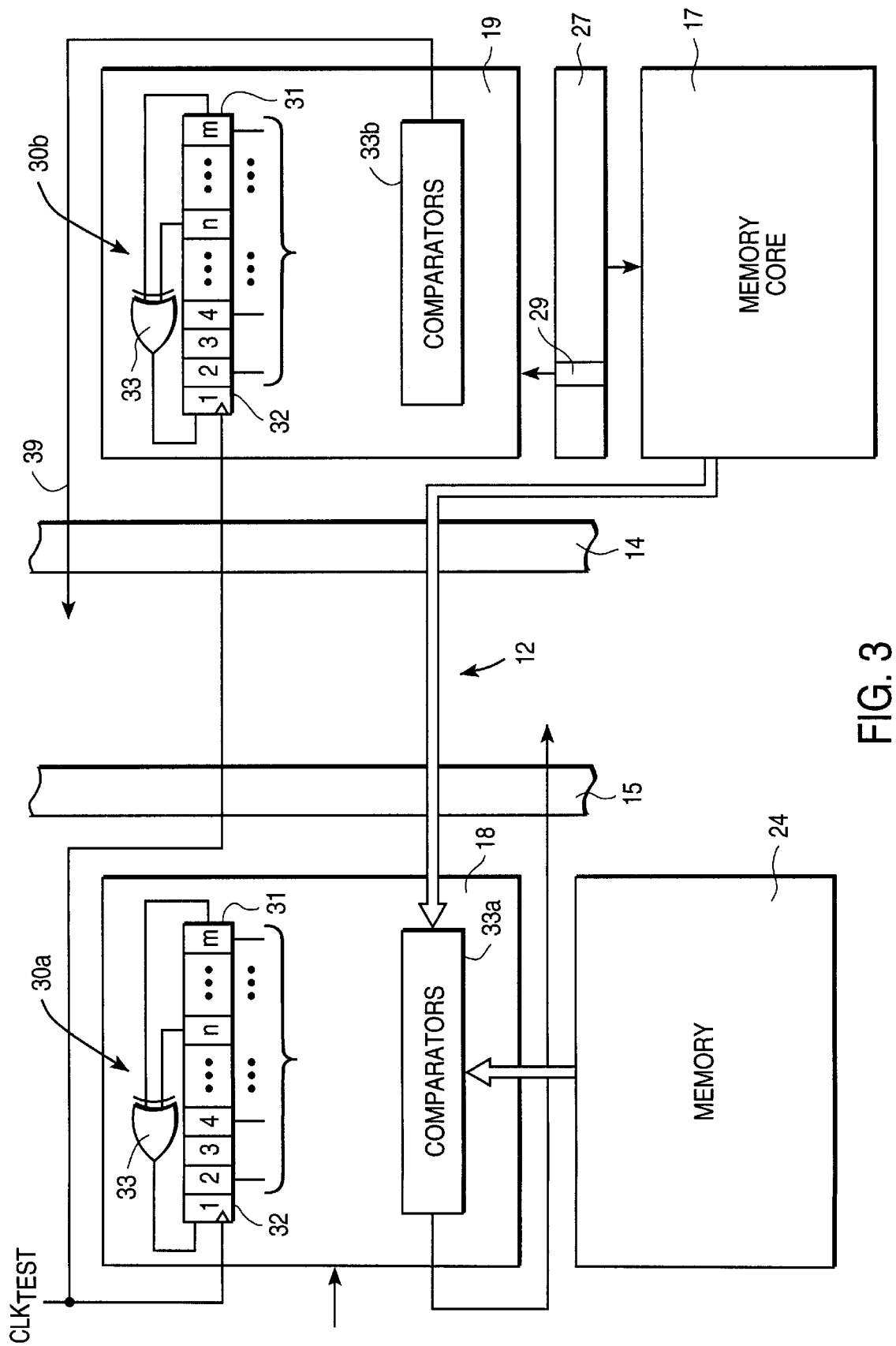
FIG. 3 is a circuit schematic diagram illustrating the implementation of the test circuitry of the preferred embodiment in detecting errors when data transfer is from the memory to the controller in the data channel system shown in FIG. 1.

FIG. 3 illustrates the data flow for performing diagnostics during the second phase of the test cycle. The sequence of bit patterns transmitted to the memory 11 during the first phase of the test cycle are now resident (stored) in the memory core 17 (assuming the data was stored in the first phase). Then, to commence the test of the return leg, the data stored in memory core 17 is retrieved, sent onto the channel 12 and input to the comparator circuit 33a of the test circuit 18. Since the memory 11 stored the bit patterns based on the pseudo-random pattern sequence, loading the data back in the same order sends bit patterns back to the test circuit 18. Also since the controller 10 had retained the originally sent pattern in the memory 24, this stored data is retrieved and compared to the data returning from the memory 11. The two bit patterns are input to the comparator 33a for performing the comparison, in the similar fashion as described above for the comparator 33b.

Again, if error is indicated, error detection can be noted by the various techniques described above. The preferred technique is to generate a separate error indication signal 38, so that it can be used as a trigger to indicate an occurrence of an error in the return leg. This trigger can be used in various modes as described above for trigger signal 39.

Figure 4:
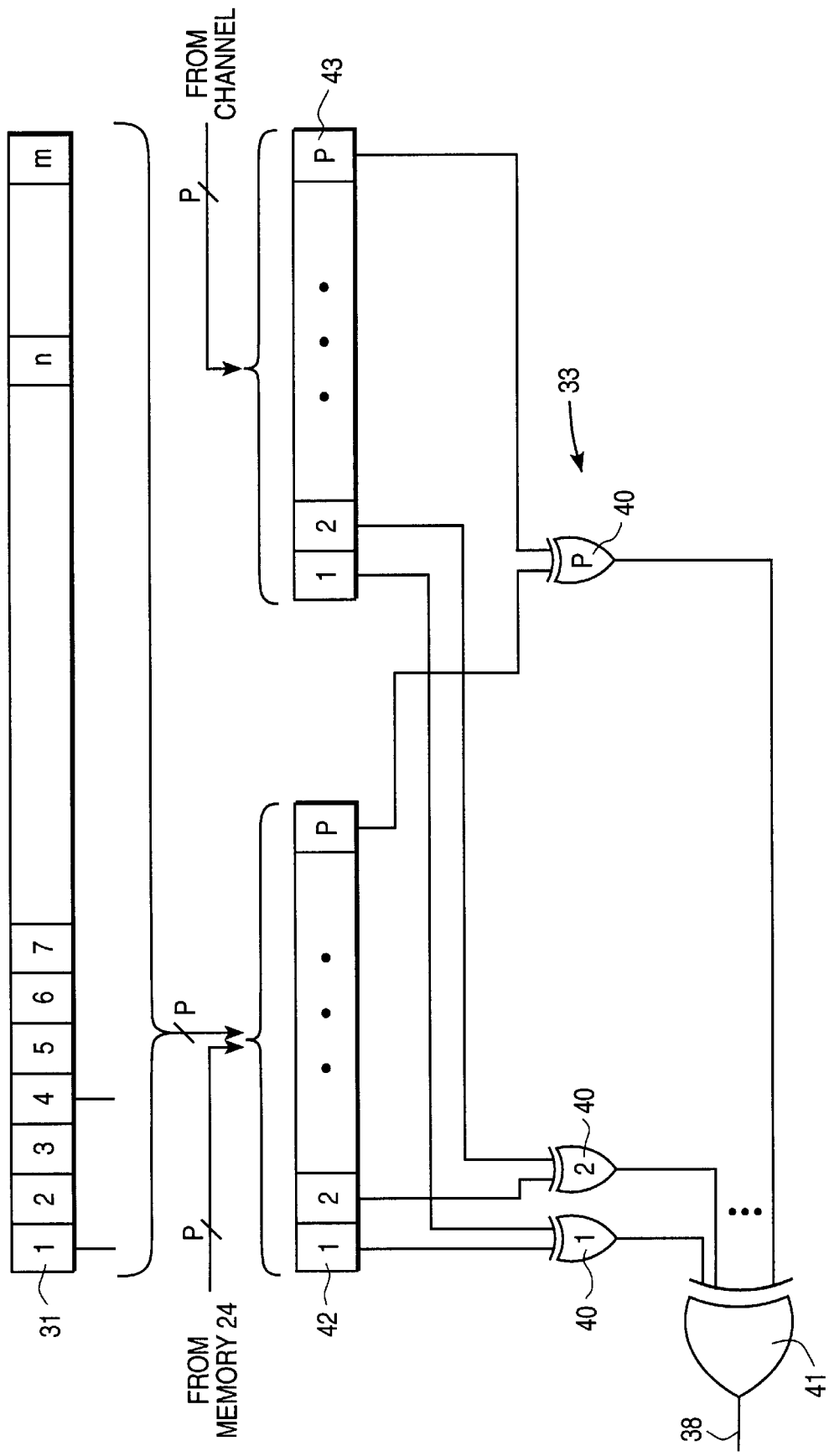
FIG. 4 is a circuit schematic diagram of a comparator circuit utilized in the test circuitry of FIGS. 2 and 3.

It is appreciated that the comparators 33a–b can be comprised from a variety of circuitry for comparing two patterns and generating an error indication signal when the patterns do not match. One comparator circuit is shown in FIG. 4 as an example circuitry for performing the comparison. The circuit is comprised of a number of XOR gates 40, one for each of the bits in the pattern. Corresponding pairs of bits of the two patterns for comparison are coupled as inputs to corresponding register 42 or 43 and then to corresponding XOR gate 40.

The input to the register 43 is the data from the channel 12. The input to the register 42 is from the LFSR 31 of the pseudo random generator 30b of circuit 19 or memory 24, depending on whether the circuit is employed in generator 33a or 33b. Thus, if each pair of bits match, the output from the XOR gates 40 will be "0". However, if a mismatch occurs, a corresponding "1" is output. An OR gate 41 OR's the outputs of the XOR gates 40 to generate the error indication signal 38 or 39. Again, any of a number of circuits can be used for the comparator circuits 33a–b.

Although the above testing scheme is preferred, other embodiments can be practiced without departing from the spirit and scope of the present invention. Thus, for example, in an alternative technique shown in FIG. 5, bit parity checking is utilized in a test circuit 19a of the memory 11. Instead of the pseudo-random generator, a parity checking circuit 60 is utilized to check the incoming bit pattern. If one bit state changes, an error is detected and error signal 39 is generated. The parity checking approach provides for a simpler technique and circuitry to be implemented in the memory device 11.

Figure 5:
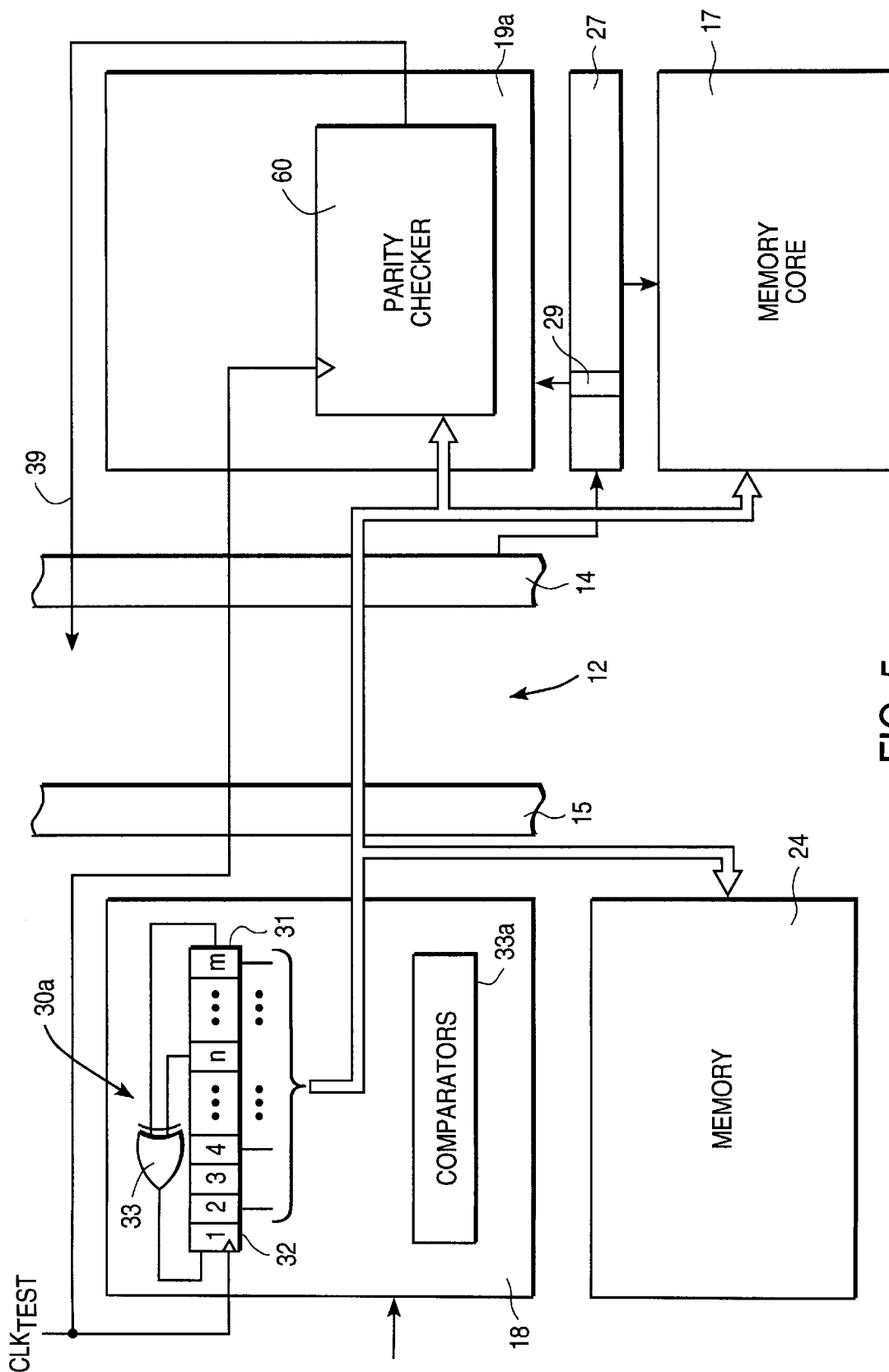
FIG. 5 is a circuit schematic diagram of an alternative test circuitry implemented in the memory for the system shown in FIG. 1, in which parity checking is utilized for error detection.
Figure 6:
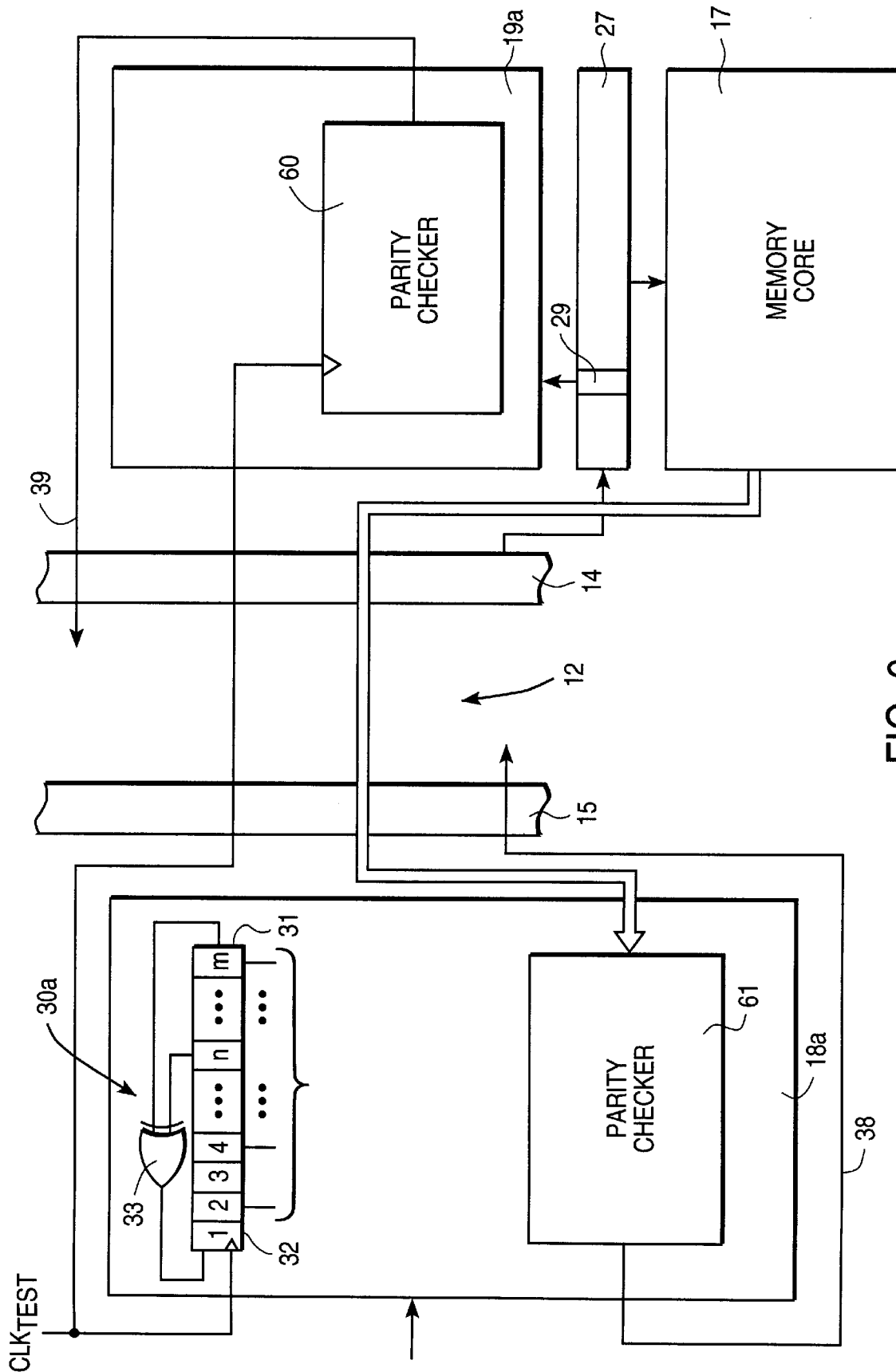
FIG. 6 is a circuit schematic diagram of an alternative test circuitry implemented in the processor and the memory for the system shown in FIG. 1, in which parity checking is utilized at both ends to detect errors.

The earlier described comparator 33a can still be utilized in the test circuitry of the controller (as shown in FIG. 5) or, alternative as shown in FIG. 6, a separate parity checking circuit 61 can be implemented in a test circuit 18a. Since parity checking is utilized on the returning data, the original data is not required to be stored in the memory 24. Again, signal 38 can be utilized for indicating an error condition when the parity checking notes an error. It is appreciated that a variety of parity checking circuits can be implemented for the parity checking circuits 60 and 61.

One advantage of using a parity checker is that user supplied bit pattern routines can be run. That is, user-defined data with parity can be sent across the high-speed data channel and diagnostics performed by the parity checking technique. This is useful once the error is localized to a given device or activity. Therefore, the parity checking technique can be used alone or in combination with the pseudo-random number generation.

Accordingly, an invention is described in which diagnostics can be performed on the data channel 12. The invention further allows segregation of the testing cycle to determine during which phase of data transfer an error occurred. In the particular example, an occurrence of an error can be detected when data is being transferred to the memory 11, such as when performing a store operation. Alternatively, an occurrence of an error can be detected when data is retrieved from the memory 11, such as when performing a load operation. Furthermore, when the pseudo-random sequence of bit patterns is maximal in length, all possible bit patterns (except for the all zero state) can be generated in the sequence for a more concise testing in using selected bit state outputs.

Accordingly, diagnostics can be performed to determine error causing events on the channel. It is possible that the causes may reside off of the channel or those off-channel devices or events may contribute to the occurrence of the error in combination with events occurring on the channel 12. That is, interfere with the activity on the channel 12. By allowing for error indication signals to be output on separate pins of the components residing on the channel, trigger signals can be generated to stop the existing process and/or commence diagnostic procedures to detect the cause of the error.

Furthermore, since the diagnostic routine is designed for operation on testing the high-speed data channel, other system operations (aside from the high-speed data channel activity) can continue to be performed. The diagnostic routine can be utilized for strictly testing or debugging the high-speed data channel, or it can be integrated as part of a system diagnostic. The incorporation of the hardware in the devices located on the high-speed data channel allows debugging without relying strictly on the main processor or the diagnostic software being executed by the main processor.

Figure 7:
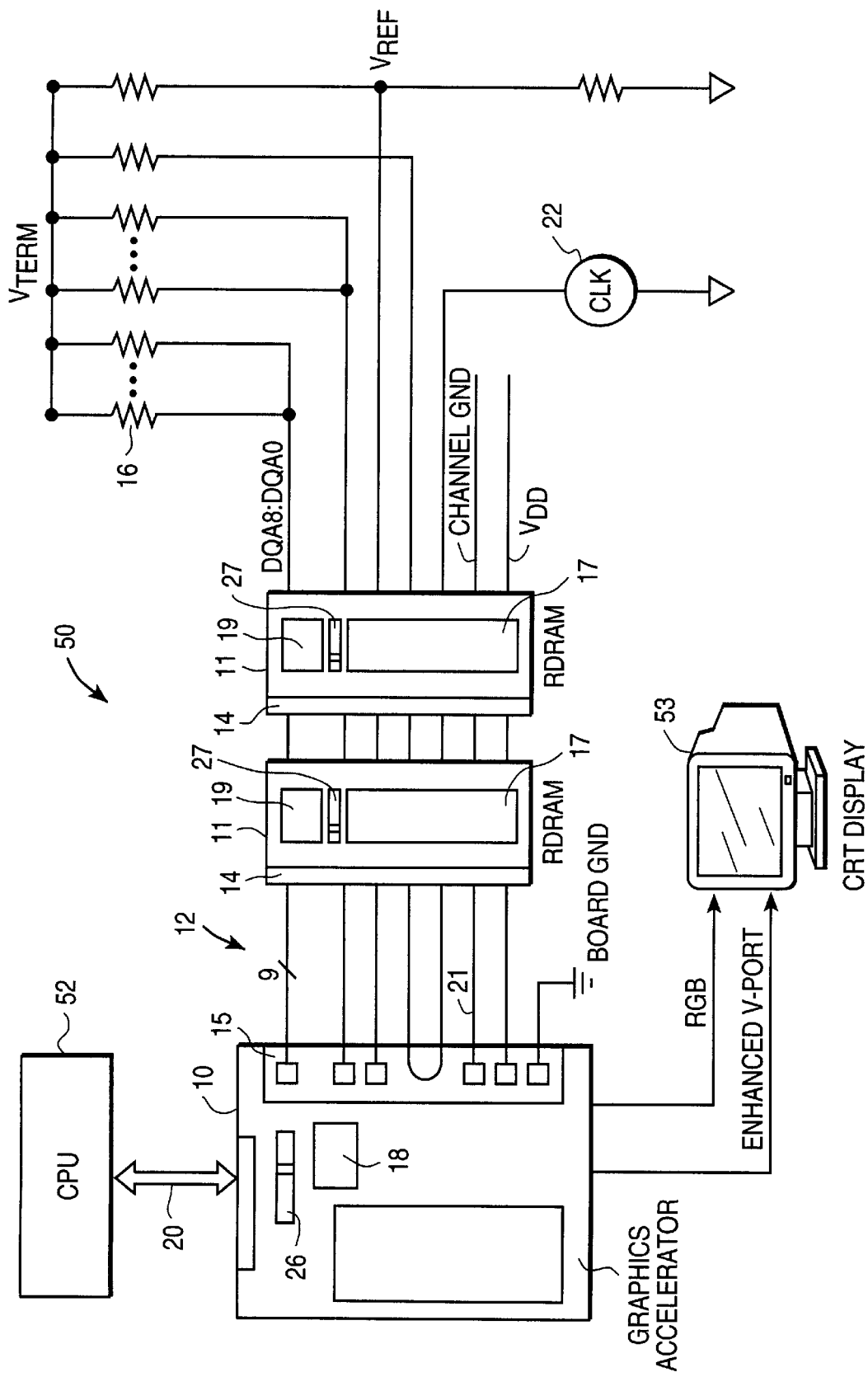
FIG. 7 is a circuit schematic diagram showing one example of a system utilizing the present invention, in which a graphics accelerator is implemented in the controller and coupled to DRAMs on a high-speed data channel, to process graphics data for display onto a display unit.

Accordingly, it is appreciated that the present invention can be utilized in a variety of processing or controlling devices coupled to a high-speed data channel. For example, in FIG. 7 a graphics system 50 is shown. When implemented in system 50, the controller 10 is a graphics accelerator that is coupled to a Rambus channel 12. Also on the Rambus channel are RDRAMs 11, which store video data for manipulation by the graphics accelerator. The clock 22, a reference voltage $V_{REF}$, $V_{DD}$, channel ground 21, board ground, the termination resistors 16 to $V_{TERM}$ are shown as standard parts of the Rambus channel. The voltages $V_{DD}$, $V_{TERM}$ and the grounds are coupled onto the board from external sources, such as external power supplies. The graphics controller is coupled to a central processing unit (CPU) 52 by the PCI bus 20 and to a display monitor 53.

The CPU 52 processes data and sends instructions to the controller 10, which is loaded into the control register 26. The graphics data is stored in the RDRAMs 11 and at the appropriate time, the data is read and processed by the controller 10 for display on the monitor 53. The controller may employ different video protocol (such as RGB and enhanced V-Port) to display the images on the monitor 53. The testing circuitry 18, 19 are implemented in the graphics accelerator 10 and in the RDRAM (or other equivalent components on the data channel), in order to perform diagnostics on data being transferred on data lines (shown as DQA8:DQA0 in FIG. 7) of the high-speed data channel 12, such as the Rambus channel.

Figure 8A:
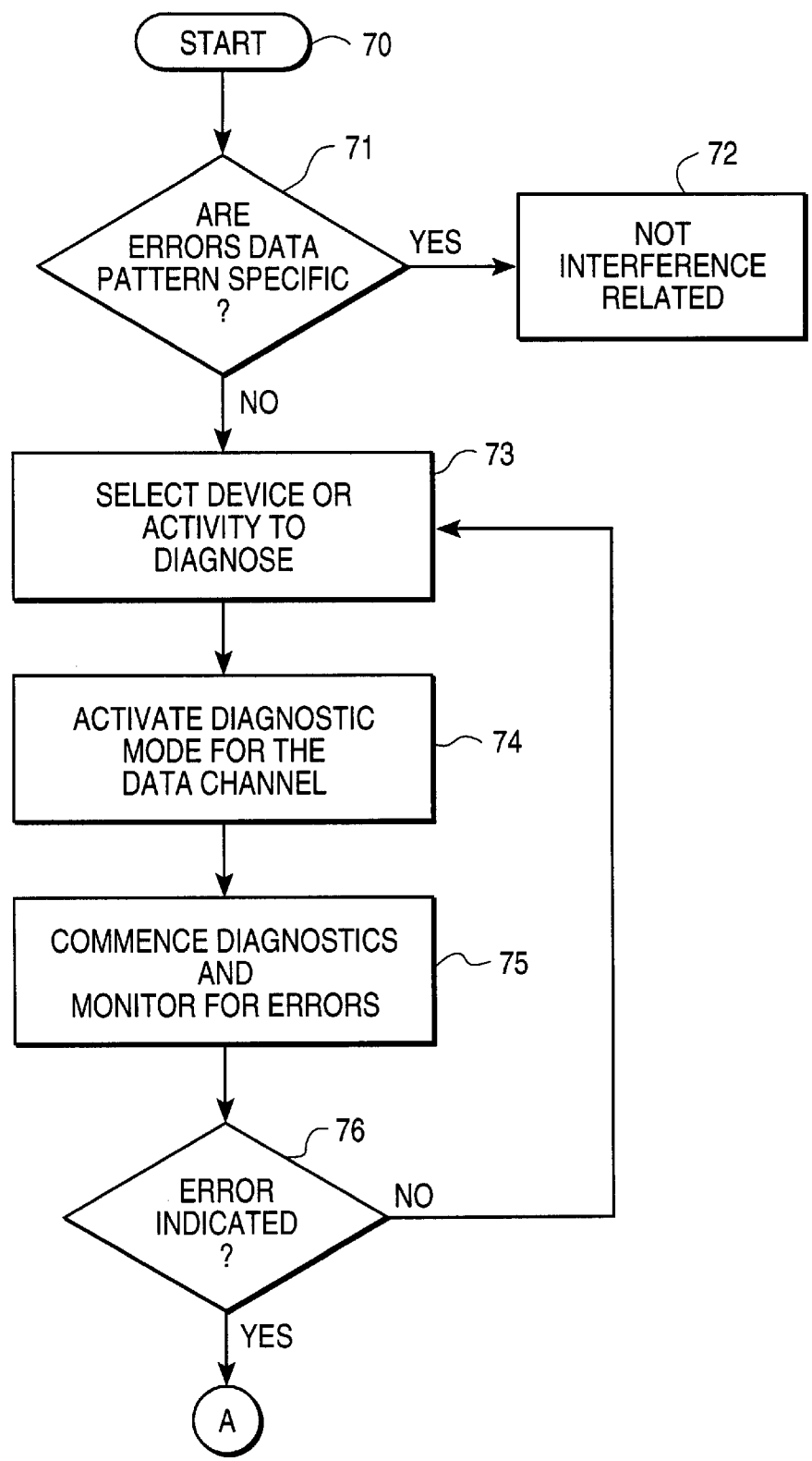
FIGS. 8A and 8B show a flow chart illustrating one example diagnostic routine for localizing an error on the high-speed data channel when the error is interference induced.
Figure 8B:
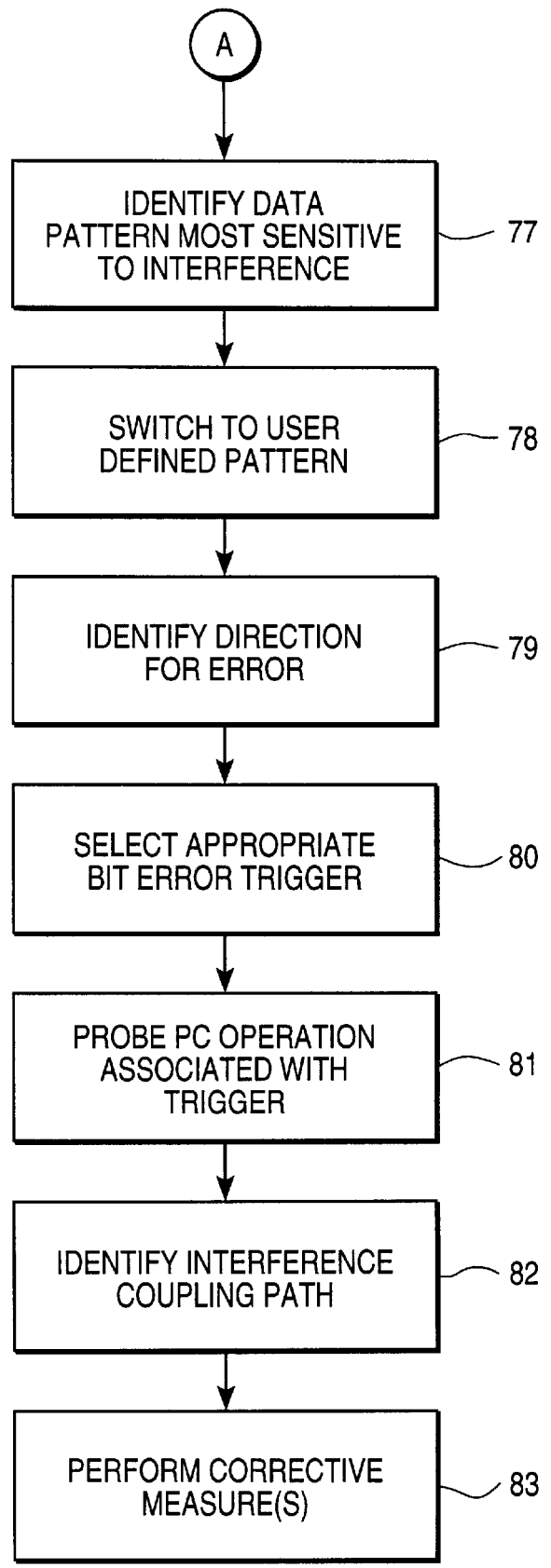

A variety of diagnostic routines can be run to test the high-speed data channel and diagnose the cause of errors occurring on the channel. One such example is a routine shown in the flow chart of FIGS. 8A and 8B, which is described utilizing the various numerical references described above. In FIGS. 8A–B, the diagnostic routine commences (block 70) to first determine if the errors reproduced are based only on specific data channel data patterns (block 71). If yes, then the problem is related to the channel itself and not to interfering activity off of the channel (block 72). A likely problem may be the interface circuitry 14, 15 shown in FIG. 1. If no, then it is likely related to interference and the cause may be another device associated with the channel, but not the channel itself. For example, the cause could be the processing circuit 23 of the controller, controller 10 to bus 20 writes, bus 20 to controller 10 writes, disk drive activity-induced power glitches, etc.

Accordingly, a device or activity is selected for testing (block 73) and the diagnostic mode is activated for the devices on the high-speed data channel 12 (block 74). A typical practice is to employ software routines to troubleshoot a specific activity. For example, in the personal computer (PC) area, diagnostic software, which when executed cause disproportionately high levels of activity in a specific category (such as disk drive activity), are utilized extensively. These routines can be run for the specific activity or device being tested. However, it is to be noted that although these software routines are helpful in troubleshooting the specific device or activity, these routines are not designed for debugging high-speed data channels which are ancillary to the device or activity under test.

Thus, a particular software routine is executed to test the specific activity or device, while the earlier described diagnostic routine for the channel is utilized by devices on the channel (such as the controller 10 and memory 11) to detect interference errors (block 75). If no error occurs (block 76), another device or activity is selected for testing (return to block 73). If errors are noted, then the data pattern most sensitive to interference is determined (block 77).

At this point, there are several choices. One is to stay with the current routine. The other is to switch to a user-defined routine which may be more applicable for the type of error detected (block 78). The test circuitry will determine the direction of the data transfer when the error occurred (block 79) and generates an appropriate error indication trigger (block 80). Then, other troubleshooting techniques can be employed for localization of the cause. For example, in PCs, the PC operation associated with the trigger event can be probed (block 81) to identify the interference coupling path to the channel (block 82). Finally, corrective measures can be performed (block 83).

It is appreciated that the above is presented as an example in utilizing the present invention to troubleshoot errors occurring on the high-speed data channel, which can be the result of devices or activity residing off of the channel.

Thus, an error detection scheme for a high-speed data channel is described. Although the channel described references a Rambus channel, the invention can be readily practiced on other data channels as well.

I claim:

1. A method of detecting an error when transferring data on a data channel between a controller and a data storage component comprising:

generating a test pattern in the controller;

transmitting the test pattern onto the data channel;

receiving the test pattern by the data storage component;

testing the received test pattern in the data storage component;

detecting an error in the data storage component if the received test pattern has been corrupted in a transfer from the controller to the data storage component, the error being detected without retrieving the test pattern from the data storage component back to the controller.

2. The method of claim 1 further comprises the generating of a hardware trigger signal when the error is detected in the data storage component.

3. The method of claim 2 wherein said generating the test pattern generates a pseudo-random bit pattern and said testing the received test pattern compares the received test pattern to a duplicate pseudo-random bit pattern generated in the data storage component.

4. The method of claim 3 further comprises retrieving the transmitted test pattern in a return transmission, comparing the retrieved pattern to the transmitted test pattern, and detecting an error in the return transmission if the transmitted test pattern and the retrieved pattern are different.

5. The method of claim 2 wherein said testing the received test pattern checks for the parity of the received test pattern.

6. The method of claim 5 further comprises retrieving the transmitted test pattern in a return transmission and checking the parity of the retrieved pattern to detect an error in the return transmission.

7. A method of detecting an error when transferring data on a high-speed data channel between a controller and a data storage component disposed on the channel comprising:

generating a test bit pattern in the controller;

transmitting the test bit pattern onto the data channel;

receiving the test bit pattern by the data storage component;

testing the received test bit pattern in the data storage component;

detecting an error in the data storage component if the test bit pattern has been corrupted in a transfer from the controller to the data storage component, the error being detected without retrieving the test pattern from the data storage component back to the controller.

8. The method of claim 7 further comprises the generating of a hardware trigger signal when the error is detected in the data storage component.

9. The method of claim 8 wherein said generating the test bit pattern comprises generating a sequence of pseudo-random bit patterns to derive the test bit pattern.

10. The method of claim 9 further comprises the duplicating of the sequence of pseudo-random bit patterns in the data storage component, so that the test bit pattern of the controller and the duplicate pattern of the data storage component are synchronized to have the same pattern, and comparing the received test bit pattern to the duplicate pattern to detect an error.

11. The method of claim 10 further comprises storing the test bit pattern in the data storage component when received, retrieving the stored bit pattern from the data storage component in a return transmission, comparing the retrieved bit pattern to the transmitted test bit pattern to detect a return error in the return transmission when the transmitted test bit pattern and the returned pattern are different.

12. The method of claim 11 further comprises the generating of a second hardware trigger signal in the controller when the return error is detected.

13. The method of claim 11 further comprises the generating of a second hardware trigger signal in the controller when the return error is detected.

14. The method of claim 8 wherein said testing the received test bit pattern checks for the parity of the received test bit pattern.

15. The method of claim 14 further comprises storing the test bit pattern in the data storage component when received, retrieving the stored bit pattern from the data storage component in a return transmission, and checking for the parity of the retrieved pattern to detect a return error in the return transmission.

16. A method of detecting data transmission error on a data channel when a controller component utilized to transfer data on the data channel and a data storage component utilized to store data sent from the controller are placed into a diagnostic mode comprising:

placing the two components on the data channel into a diagnostic mode;

generating in the controller a test pattern which is derived from a sequence of pseudo-random bit patterns;

transmitting the test pattern onto the data channel from the controller to the data storage component;

duplicating the test pattern in the data storage component;

receiving the test pattern by the data storage component;

comparing the received test pattern to the duplicate pattern in the data storage component;

detecting an error in the data storage component without retrieving the test pattern from the data storage component back to the controller component, if the received bit pattern and the duplicate pattern are different;

indicating an error condition by the data storage component if an error is detected.

17. The method of claim 16 further comprises the generating of a hardware trigger signal to indicate the error condition.

18. The method of claim 17 further comprises storing the test pattern in the data storage component when received, retrieving the stored test pattern in a return transmission to the controller component, comparing the retrieved pattern to the transmitted test pattern and detecting in the controller component a return error in the return transmission if the transmitted test pattern and the retrieved pattern are different.

19. A data storage component comprising:

a test circuit coupled to receive and test an incoming test signal transmitted from a controller when the data storage component is placed into a diagnostic mode, said test circuit to detect an error in the test signal caused in a transfer from the controller to the data storage component, the error being detected without retrieving the test pattern from the data storage component back to the controller, a multi-function pin coupled to said test circuit, in which said pin functions for its intended purpose when the data storage component is in its normal data storage mode, but said pin functions to indicate an error when said test circuit detects an error in the test signal when in the diagnostic mode.

20. The data storage component of claim 19 wherein said test circuit is comprised of a parity checker to check for the parity of the incoming test signal.

21. The data storage component of claim 20 wherein a high-speed data channel to effect data transfer, including the test signal, is a Rambus™ channel.

22. The data storage component of claim 19 wherein said test circuit is comprised of a pseudo-random bit pattern generator to compare a pseudo-randomly generated bit pattern to a bit pattern of the test signal.

23. The data storage component of claim 22 wherein a high-speed data channel to effect data transfer, including the test signal, is a Rambus™ channel.

24. A controller comprising:
   a digital processing circuit to process digital data and to transfer digital data to and from a data storage component when coupled to the contoller;
   a test circuit coupled to said digital processing circuit to generate a test signal which will be transmitted to the data storage component on a data channel when the controller and the data storage component are placed into a diagnostic mode, said test circuit when operating with the data storage component in the diagnostic mode causes the data storage component to test the test signal and to detect an error in a transfer from the controller to the data storage component, the error being detected without retrieving the test pattern from the data storage component back to the controller.

25. The controller of claim 24 wherein said test circuit is comprised of a pseudo-random bit pattern generator which generates a bit pattern as said test signal.

26. The controller of claim 25 further comprising a multi-function pin coupled to said test circuit, in which said pin functions for its intended purpose when the controller is in its normal controller mode, but said pin functions to indicate an error while in the diagnostic mode, if the test signal sent to the data storage component is later retrieved from the data storage component and is corrupted.

27. The controller of claim 24 wherein a high-speed data channel to effect data transfer, including the test signal, is a Rambus™ channel.

28. An apparatus for detecting error when transferring data on a data channel between a controller and a data storage component disposed on the channel comprising:
   a first test circuit, included in the controller coupled to the data channel, for generating a test pattern and transmitting the test pattern onto the data channel;
   a second test circuit, included in a data storage component coupled to the data channel, for testing the test pattern;
   said second test circuit including a circuit for receiving the test pattern transmitted from the first test circuit and detecting an error if the test pattern has been corrupted.

29. The apparatus of claim 28 wherein said first and second test circuits each includes a pseudo-random generator for generating an identical sequence of test patterns in which the test pattern is transmitted from the controller and compared to a duplicate pattern in said second test circuit to determine if any error occurred in the transmission.

30. The apparatus of claim 29 wherein the data storage component includes a multi-function pin coupled to said second test circuit, in which said pin functions for its intended purpose when the data storage component is in its normal data storage mode, but said pin functions to indicate an error when said second test circuit detects an error in the test pattern when in a diagnostic mode.

31. The apparatus of claim 30 wherein the controller and data storage components are disposed on a Rambus™ channel.

32. The apparatus of claim 28 wherein a parity checking circuit in said second test circuit checks parity to determine if any error occurred in the transmission.

33. The apparatus of claim 32 wherein the data storage component includes a multi-function pin coupled to said second test circuit, in which said pin functions for its intended purpose when the data storage component is in its normal data storage mode, but said pin functions to indicate an error when said second test circuit detects an error in the test pattern when in a diagnostic mode.

34. The apparatus of claim 33 wherein the controller and data storage components are disposed on a Rambus™ channel.

* * * * *